(12) United States Patent
O'Brien

(10) Patent No.: US 6,967,038 B2
(45) Date of Patent: Nov. 22, 2005

(54) PRODUCTION OF CATALYST COATED MEMBRANES

(75) Inventor: William George O'Brien, Newark, DE (US)

(73) Assignee: E.I. du Pont Demours and Company, Wilmington, DE (US)

( * ) Notice: Subject to any disclaimer, the term of this patent is extended or adjusted under 35 U.S.C. 154(b) by 187 days.

(21) Appl. No.: 10/380,921

(22) PCT Filed: Oct. 26, 2001

(86) PCT No.: PCT/US01/51385
§ 371 (c)(1),
(2), (4) Date: Mar. 18, 2003

(87) PCT Pub. No.: WO02/43171
PCT Pub. Date: May 30, 2002

(65) Prior Publication Data
US 2004/0081749 A1 Apr. 29, 2004

Related U.S. Application Data
(60) Provisional application No. 60/243,903, filed on Oct. 27, 2000.

(51) Int. Cl.[7] .............................. B05D 1/28; B05D 5/12
(52) U.S. Cl. ....................... 427/115; 427/258; 427/261; 427/265
(58) Field of Search ................................ 427/115, 258, 427/261, 265; 429/40–45; 502/101

(56) References Cited

U.S. PATENT DOCUMENTS

| 5,871,860 A | * | 2/1999 | Frost et al. ................... 429/40 |
| 6,074,692 A | * | 6/2000 | Hulett ......................... 427/115 |
| 6,465,136 B1 | * | 10/2002 | Fenton et al. ................ 429/309 |
| 6,500,217 B1 | * | 12/2002 | Starz et al. ................ 29/623.5 |

FOREIGN PATENT DOCUMENTS

| CA | 2300226 | * | 9/2000 |
| EP | 1037295 | | 9/2000 |
| JP | 09 245801 | | 9/1997 |
| JP | 09 245802 | | 9/1997 |

* cited by examiner

Primary Examiner—Fred J. Parker (57) ABSTRACT

A method for the production of catalyst coated membranes, especially catalyst coated membranes for use in fuel cells, includes raised relief printing a catalyst coating composition (11) onto the surface of an ion exchange membrane (16) to form at least one electrode layer.

10 Claims, 2 Drawing Sheets

PRODUCTION OF CATALYST COATED MEMBRANES

This application is a 371 of PCT/US01/51385 filed on Oct. 26, 2001 which claims benefit of application Ser. No. 60/243,903 filed Oct. 27, 2000.

FIELD OF THE INVENTION

This invention relates to a method for the production of catalyst coated membranes for use in electrochemical cells, especially catalyst coated membranes for use in fuel cells.

BACKGROUND OF THE INVENTION

A variety of electrochemical cells falls within a category of cells often referred to as solid polymer electrolyte ("SPE") cells. An SPE cell typically employs a membrane of a cation exchange polymer that serves as a physical separator between the anode and cathode while also serving as an electrolyte. SPE cells can be operated as electrolytic cells for the production of electrochemical products or they may be operated as fuel cells.

Fuel cells are electrochemical cells that convert reactants, namely fuel and oxidant fluid streams, to generate electric power and reaction products. A broad range of reactants can be used in fuel cells and such reactants may be delivered in gaseous or liquid streams. For example, the fuel stream may be substantially pure hydrogen gas, a gaseous hydrogen-containing reformate stream, or an aqueous alcohol; for example methanol in a direct methanol fuel cell (DMFC). The oxidant may, for example, be substantially pure oxygen or a dilute oxygen stream such as air.

In SPE fuel cells, the solid polymer electrolyte membrane is typically perfluorinated sulfonic acid polymer membrane in acid form. Such fuel cells are often referred to as proton exchange membrane ("PEM") fuel cells. The membrane is disposed between and in contact with the anode and the cathode. Electrocatalysts in the anode and the cathode typically induce the desired electrochemical reactions and may be, for example, a metal black, an alloy or a metal catalyst supported on a substrate, e.g., platinum on carbon. SPE fuel cells typically also comprise a porous, electrically conductive sheet material that is in electrical contact with each of the electrodes, and permit diffusion of the reactants to the electrodes. In fuel cells that employ gaseous reactants, this porous, conductive sheet material is sometimes referred to as a gas diffusion layer and is suitably provided by a carbon fiber paper or carbon cloth. An assembly including the membrane, anode and cathode, and gas diffusion layers for each electrode, is sometimes referred to as a membrane electrode assembly ("MEA"). Bipolar plates, made of a conductive material and providing flow fields for the reactants, are placed between a number of adjacent MEAs. A number of MEAs and bipolar plates are assembled in this manner to provide a fuel cell stack.

For the electrodes to function effectively in SPE fuel cells, effective electrocatalyst sites must be provided. Effective electrocatalyst sites have several desirable characteristics: (1) the sites are accessible to the reactant, (2) the sites are electrically connected to the gas diffusion layer, and (3) the sites are ionically connected to the fuel cell electrolyte. In order to improve ionic conductivity, ion exchange polymers are often incorporated into the electrodes. In addition, incorporation of ion exchange polymer into the electrodes can also have beneficial effects with liquid feed fuels. For example, in a direct methanol fuel cell, ion exchange polymer in the anode makes it more wettable by the liquid feed stream in order to improve access of the reactant to the electrocatalyst sites.

In electrodes for some fuel cells employing gaseous feed fuels, hydrophobic components such as polytetrafluoroethylene ("PTFE") are typically employed, in part, to render electrodes less wettable and to prevent "flooding". Flooding generally refers to a situation where the pores in an electrode become filled with water formed as a reaction product, such that the flow of the gaseous reactant through the electrode becomes impeded.

Essentially two approaches have been taken to form electrodes for SPE fuel cells. In one, the electrodes are formed on the gas diffusion layers by coating electrocatalyst and dispersed particles of PTFE in a suitable liquid medium onto the gas diffusion layer, e.g., carbon fiber paper. The carbon fiber paper with the electrodes attached and a membrane are then assembled into an MEA by pressing such that the electrodes are in contact with the membrane. In MEA's of this type, it is difficult to establish the desired ionic contact between the electrode and the membrane due to the lack of intimate contact. As a result, the interfacial resistance may be higher than desired. In the other main approach for forming electrodes, electrodes are formed onto the surface of the membrane. A membrane having electrodes so formed is often referred to as a catalyst coated membrane ("CCM"). Employing CCMs can provide improved performance over forming electrodes on the gas diffusion layer but CCMs are typically more difficult to manufacture.

Various manufacturing methods have been developed for manufacturing CCMs. Many of these processes have employed electrocatalyst coating slurries containing the electrocatalyst and the ion exchange polymer and, optionally, other materials such as a PTFE dispersion. The ion exchange polymer in the membrane itself, and in the electrocatalyst coating solution could be employed in either hydrolyzed or unhydrolyzed ion-exchange polymer (sulfonyl fluoride form when perfluorinated sulfonic acid polymer is used), and in the latter case, the polymer must be hydrolyzed during the manufacturing process. Techniques that use unhydrolyzed polymer in the membrane, electrocatalyst composition or both can produce excellent CCMs but are difficult to apply to commercial manufacture because a hydrolysis step and subsequent washing steps are required after application of the electrode. In some techniques, a "decal" is first made by depositing the electrocatalyst coating solution on another substrate, removing the solvent and then transferring and adhering the resulting decal to the membrane. These techniques also can produce good results but mechanical handling and placement of decals on the membrane are difficult to perform in high volume manufacturing operations.

A variety of techniques have been developed for CCM manufacture which apply an electrocatalyst coating solution containing the ion exchange polymer in hydrolyzed form directly to membrane also in hydrolyzed form. However, the known methods again are difficult to employ in high volume manufacturing operations. Known coating techniques such as spraying, painting, patch coating and screen printing are typically slow, can cause loss of valuable catalyst and require the application of relatively thick coatings. Thick coatings contain a large amount of solvent and cause swelling of the membrane which causes it to sag, slump, or droop, resulting in loss of dimensional control of the membrane, handling difficulties during processing, and poor electrode formation. Attempts have been made to overcome such problems for mass production processes. For example, in U.S. Pat. No. 6,074,692, a slurry containing the electrocatalyst in a liquid vehicle such as ethylene or propylene glycol is sprayed on the membrane while the membrane is held in a tractor clamp feed device. This patent teaches pretreating the membrane with the liquid vehicle prior to the spraying operation to decrease the swelling problems. However, processes employing such pretreatment steps are complicated, difficult to control, and require the removal of large amounts of the vehicle in a drying operation. Such drying operations are typically slow and require either disposal or recycling of large quantities of the vehicle to comply with applicable environmental requirements.

Accordingly, a process is needed which is suitable for the high volume production of catalyst coated membrane and which avoids problems associated with prior art processes. Further, a process is needed which is suitable for the direct application of an electrocatalyst coating composition to a membrane in hydrolyzed form which avoids the swelling problems associated with known processes and which does not require complicated pre-treatment or post-treatment process steps.

BRIEF SUMMARY OF THE INVENTION

The invention provides a process for manufacturing catalyst coated membrane comprising: preparing an electrocatalyst coating composition comprising an electrocatalyst and an ion exchange polymer in a liquid medium; and raised relief printing said catalyst coating composition onto a first surface of an ion exchange membrane. The raised relief printing forms at least one electrode layer covering at least a part of said surface of said membrane. Preferably, the raised relief printing technique employed is flexographic printing.

In a preferred process, the raised relief printing is repeated to form multiple electrode layers covering the same part of the surface of the membrane. If desired, the process advantageously provides multiple electrode layers which vary in composition. In addition or alternatively, the raised relief printing advantageously provides an electrode layer with a predetermined nonuniform distribution of electrocatalyst across the electrode layer.

The process in accordance with the invention is extremely well-suited to high volume commercial manufacture of catalyst coated membrane. Raised relief printing provides thin, well-distributed layers of the electrocatalyst composition and avoids problems associated with coating techniques which employ large quantities of solvent. The process is extremely versatile and can provide electrodes in any of a wide variety of shapes and patterns and, if desired, can have electrocatalyst or other electrode materials which vary in amount or composition across the electrode, through the thickness of the electrode or both.

DETAILED DESCRIPTION

This invention provides a process for manufacturing catalyst coated membranes which employs raised relief printing technology to apply electrocatalyst containing coating compositions onto ion exchange membranes. Of particular interest is such a printing process adapted for preparing catalyst coated membranes for fuel cell applications.

Raised relief printing as used herein refers to processes which employ any of a variety of types of pre-formed plates which have raised areas which define the shape or pattern to be printed on a substrate. In use in accordance with the present invention, the raised areas of the plate are contacted by and become coated with a liquid electrocatalyst coating composition and then the raised areas are brought into contact with the ion exchange membrane to deposit the composition onto the membrane. After drying, the shape or pattern defined by the raised areas is thereby transferred to the ion exchange membrane to form an electrode layer. If desired, the relief printing is advantageously employed to form an electrode that is a build-up of multiple electrode layers.

In accordance with a preferred form of the present invention, flexographic printing is the raised relief printing method employed. Flexographic printing is a well known printing technique used widely for packaging applications which employs elastomeric printing plates and is described in the Kirk-Othmer's Encyclopedia of Chemical Technology, 4th edition, 1996, John Wiley and Sons, New York, N.Y., volume 20, pages 62–128,especially pages 101–105. Such plates include sheet photopolymer plates, sheets made from liquid photopolymer and rubber printing plates. Especially useful are flexographic printing techniques which use photopolymer printing plates. The most preferred relief printing technique employs solid-sheet photopolymer plates such as the photopolymer flexographic printing plates sold by E.I. Du Pont de Nemours and Company of Wilmington, Del. under the trademark Cyrel®.

The flexographic method offers considerable benefits in cost, changeover, speed, ease of printing on thin extensible substrates, such as ion exchange membranes and in the variety of electrodes which can be printed. The printed area may be of virtually any shape or design, both regular or irregular, which can be transferred to the plate. Possible shapes include circles, ovals, polygons, and polygon having rounded corners. The shape may also be a pattern and may be intricate if desired. For example, flexography may be used to print an electrode having a shape that coincides with pathway of fuel and oxidant flow fields.

Multiple applications of the same or different coatings to the same area are easily accomplished using flexographic printing. In existing uses of flexography, it is common to apply multiple colors of ink in close registration and these techniques are well-suited to the printing of electrodes having overlying multiple layers. The composition and the amount of coating applied per application may be varied. The amount of coating applied at each pass may be varied across the coated area, i.e., length and/or width. Such variation need not be monotonic or continuous. The precision of flexographic printing has the further advantage of being very economical in the use of coating solution, which is particularly important for expensive electrocatalyst coatings.

The process of the invention also preferably includes the raised relief printing of a catalyst coating composition onto the opposite surface of an ion exchange membrane to form at least one electrode layer covering at least a part of the opposite surface of the membrane in registration with the electrode layer first applied to the membrane. Again, the ability of flexographic printing to handle multiple applications in close registration is useful for this aspect of the invention.

In the preferred flexographic printing method in accordance with the invention using solid-sheet photopolymer flexographic plates, commercially-available plates such those sold under the trademark Cyrel® are well adapted for use in the process. Cyrel® plates are thick slabs of photopolymer uniformly deposited/bonded to 5 to 8 mil poly (ethylene terephthalate) (PET), then capped with a thin easy-release PET coversheet. The photopolymer itself is a miscible mixture of about 65% acrylic polymer(s), 30% acrylic monomer(s), 5% dyes, initiators, and inhibitors. U.S. Pat. Nos. 4,323,636 and 4,323,637 disclose photopolymer plates of this type.

Negatives having images to create the raised areas on the plate can be designed by any suitable method and the creation of negatives electronically has been found to be especially useful. Upon UV exposure through the negative, monomer polymerization occurs in select areas. Following removal of the PET coversheet, unexposed, non-polymerized material may be removed by a variety of methods. The unexposed areas may be simply washed away by the action of a spray developer. Alternatively, the non-polymerized monomer may be liquefied by heating and then removed with an absorbent wipe material. A compressible photopolymer relief surface, made to photographic resolution is thus created. This relief surface serves to transfer electrocatalyst coating composition from a bulk applicator to a print applicator or to the substrate surface itself. Formation of an electrode layer occurs by simple wetting coupled with mechanical compression of the elastomeric plate.

When rubber printing plates are employed, the pattern may be generated by known techniques including molding said rubber plate in the desired pattern or by laser ablation to yield the desired shape or pattern.

The process of the present invention employs electrocatalyst coating compositions which are adapted for use in the raised relief printing process. The compositions include an electrocatalyst and an ion exchange polymer in a suitable liquid medium. The ion exchange polymer performs several functions in the resulting electrode including serving as a binder for the catalyst and improving ionic conductivity to catalyst sites. Optionally, other components are included in the composition, e.g., PTFE in dispersion form.

Electrocatalysts in the composition are selected based on the particular intended application for the CCM. Electrocatalysts suitable for use in the present invention include one or more platinum group metal such as platinum, ruthenium, rhodium, and iridium and electroconductive oxides thereof, and electroconductive reduced oxides thereof. The catalyst may be supported or unsupported. For direct methanol fuel cells, a $(Pt-Ru)O_X$ electocatalyst has been found to be useful. One particularly preferred catalyst composition for hydrogen fuel cells is platinum on carbon, 60 wt % carbon, 40 wt % platinum such as the material with this composition obtainable from E-Tek Corporation Natick, Mass. which, when employed accordance with the procedures described herein, provided particles in the electrode which are less than 1 $\mu$m in size.

Since the ion exchange polymer employed in the electrocatalyst coating composition serves not only as binder for the electrocatalyst particles but also assists in securing the electrode to the membrane, it is preferable for the ion exchange polymers in the composition to be compatible with the ion exchange polymer in the membrane. Most preferably, exchange polymers in the composition are the same type as the ion exchange polymer in the membrane.

Ion exchange polymers for use in accordance with the present invention are preferably highly fluorinated ion-exchange polymers. "Highly fluorinated" means that at least 90% of the total number of univalent atoms in the polymer are fluorine atoms. Most preferably, the polymer is perfluorinated. It is also preferred for use in fuel cells for the polymers to have sulfonate ion exchange groups. The term "sulfonate ion exchange groups" is intended to refer to either sulfonic acid groups or salts of sulfonic acid groups, preferably alkali metal or ammonium salts. For applications where the polymer is to be used for proton exchange as in fuel cells, the sulfonic acid form of the polymer is preferred. If the polymer in the electrocatalyst coating composition is not in sulfonic acid form when used, a post treatment acid exchange step will be required to convert the polymer to acid form prior to use.

Preferably, the ion exchange polymer employed comprises a polymer backbone with recurring side chains attached to the backbone with the side chains carrying the ion exchange groups. Possible polymers include homopolymers or copolymers of two or more monomers. Copolymers are typically formed from one monomer which is a non-functional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride ($-SO_2F$), which can be subsequently hydrolyzed to a sulfonate ion exchange group. For example, copolymers of a first fluorinated vinyl monomer together with a second fluorinated vinyl monomer having a sulfonyl fluoride group ($-SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

Especially preferred polymers for use in the present invention include a highly fluorinated, most preferably perfluorinated, carbon backbone with a side chain represented by the formula $-(O-CF_2CFR_f)_a-O-CF_2CFR'_fSO_3H$, wherein $R_f$ and $R'_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula $-O-CF_2CF(CF_3)-O-CF_2CF_2SO_3H$. Polymers of this type are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanging to convert to the acid, also known as the proton form. One preferred polymer of the type disclosed in U.S. Pat. Nos. 4,358,545 and 4,940,525 has the side chain $-O-CF_2CF_2SO_3H$. This polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and acid exchange.

For perfluorinated polymers of the type described above, the ion exchange capacity of a polymer can be expressed in terms of ion exchange ratio ("IXR"). Ion exchange ratio is defined as number of carbon atoms in the polymer backbone in relation to the ion exchange groups. A wide range of IXR values for the polymer are possible. Typically, however, the IXR range for perfluorinated sulfonate polymer is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—CF($CF_3$)—O—$CF_2$—$CF_2$—$SO_3H$ (or a salt thereof, the equivalent weight range which corresponds to an IXR of about 7 to about 33 is about 700 EW to about 2000 EW. A preferred range for IXR for this polymer is about 8 to about 23 (750 to 1500 EW), most preferably about 9 to about 15 (800 to 1100 EW).

The liquid medium for the catalyst coating composition is one selected to be compatible with the process. It is advantageous for the medium to have a sufficiently low boiling point that rapid drying of electrode layers is possible under the process conditions employed, provided however, that the composition cannot dry so fast that the composition dries on the relief printing plate before transfer to the membrane. When flammable constituents are to be employed, the selection should take into any process risks associated with such materials, especially since they will be in contact with the catalyst in use. The medium should also be sufficiently stable in the presence of the ion exchange polymer which, in the acid form, has strong acidic activity. The liquid medium typically will be polar since it should be compatible with the ion exchange polymer in the catalyst coating composition and be able to "wet" the membrane. While it is possible for water to be used as the liquid medium, it is preferable for the medium to be selected such that the ion exchange polymer in the composition is "coalesced" upon drying and not require post treatment steps such as heating to form a stable electrode layer.

A wide variety of polar organic liquids or mixtures thereof can serve as suitable liquid media for the electrocatalyst coating composition. Water in minor quantity may be present in the medium if it does not interfere with the printing process. Some preferred polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the ion exchange membrane can provide better contact and more secure application of the electrode to the membrane. A variety of alcohols are well-suited for use as the liquid medium.

Preferred liquid media include suitable C4 to C8 alkyl alcohols including, n-, iso-, sec- and tert-butyl alcohols; the isomeric 5-carbon alcohols, 1,2- and 3-pentanol, 2-methyl-1-butanol, 3-methyl, 1-butanol, etc., the isomeric 6-carbon alcohols, e.g. 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc., the isomeric C7 alcohols and the isomeric C8 alcohols. Cyclic alcohols are also suitable. Preferred alcohols are n-butanol and n-hexanol. Most preferred is n-hexanol.

The amount of liquid medium in the electrocatalyst composition will vary with the type of medium employed, the constituents of the composition, the type of printing equipment employed, desired electrode thickness, process speeds etc. The amount of liquid employed is highly dependent on viscosity of the electrocatalyst composition that is very important to achieve high quality electrodes with a minimum of waste. When n-butanol is employed as the liquid medium, a coating solids content of from about 9 to about 18% by weight is a particularly useful flexographic printing range. Below about 9% solids, viscosity is undesirably low leading to rapid settling of the catalytic particles, physical leaking from coating applicator "fountain" in standard presses and undesirably low print deposition weights. Furthermore, at levels of n-butanol greater than about 91% by weight, undesirable swelling of perfluorinated sulfonic acid membranes can result. Moreover, above about 18 wt % coating solids, the electrocatalyst coating compositions takes on a paste-like consistency with the associated handling problems, irregular plate wetting, etc.

Handling properties of the electrocatalyst coating composition, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E.I. du Pont de Nemours and Company under the trademark Nafion®, in a water/alcohol dispersion, can be used as starting material to prepare an electrocatalyst containing coating suitable for use in flexographic printing. The method of preparation involves the replacement of the lower alcohols and water in the commercially available dispersion with a C4 to C8 alkyl alcohol through a distillation process. The result is a highly stable dispersion of perfluorinated sulfonic acid polymer in a C4 to C8 alkyl alcohol with a water content less than 2%, more typically less than 0.5%. Solids content can be varied up to 20%. Using this modified dispersion as base for the electrocatalyst coating composition, the catalytic metal or carbon black supported catalytic metal required to form an electrode can be added which yields a coating composition with excellent printing properties in the process of the present invention.

In the electrocatalyst coating composition, it is preferable to adjust the amounts of electrocatalyst, ion exchange polymer and other components, if present, so that the electrocatalyst is the major component by weight of the resulting electrode. Most preferably, the weight ratio of electrocatalyst to ion exchange polymer in the electrode is about 2:1 to about 10:1.

Utilization of the electrocatalyst coating technique in accordance with the process of the present invention can produce a wide variety of printed layers which can be of essentially any thickness ranging from very thick, e.g., 20 μm or more very thin, e.g., 1 μm or less. This full range of thicknesses can be produced without evidence of cracking, loss of adhesion, or other inhomogeneities. Thick layers, or complicated multi-layer structures, can be achieved by utilizing the very precise pattern registration available using flexographic printing technology to provide multiple layers deposited onto the same area so that the desired ultimate thickness can be obtained. On the other hand, only a few layers or perhaps a single layer can be used to produce very thin electrodes. Typically, 1–2 μm thick layers are produced with each printing.

The multilayer structures mentioned above permit the electrocatalyst coating to vary in composition, for example the concentration of precious metal catalyst can vary with the distance from the membrane surface. In addition, hydrophilicity can be made to change as a function of coating thickness, e.g., layers with varying ion exchange polymer EW can be employed. Also, protective or abrasion-resistant top layers may be applied in the final layer applications of the electrocatalyst coating.

Composition may also be varied over the length and width of the electrocatalyst coated area by controlling the amount applied as a function of the distance from the center of the application area as well as by changes in coating applied per pass. This control is useful for dealing with the discontinuities that occur at the edges and corners of the fuel cell, where activity goes abruptly to zero. By varying coating composition or plate image characteristics, the transition to zero activity can be made gradual. In addition, in liquid feed fuel cells, concentration variations from the inlet to the outlet ports can be compensated for by varying the electrocatalyst coating across the length and width of the membrane.

Membranes for use in accordance with the invention can be made of the same ion exchange polymers discussed above for use in the electrocatalyst coating compositions. The membranes can be made by known extrusion or casting techniques and have thicknesses which can vary depending upon the application and typically have a thickness of 350 $\mu$m or less. The trend is to employ membranes that are quite thin, i.e., 50 $\mu$m or less. The process in accordance with the present in invention is well-suited for use in forming electrodes on such thin membranes where the problem associated with large quantities of solvent during coating are especially pronounced. While the polymer may be in alkali metal or ammonium salt form during the relief printing process, it is preferred for the polymer in the membrane to be in acid form to avoid post treatment acid exchange steps. Suitable perfluorinated sulfonic acid polymer membranes in acid form are available under the trademark Nafion® by E.I. du Pont de Nemours and Company.

Reinforced perfluorinated ion exchange polymer membranes can also be utilized in CCM manufacture by the inventive printing process. Reinforced membranes can be made by impregnating porous, expanded PTFE (ePTFE) with ion exchange polymer. ePTFE is available under the tradename Goretex® from W. L. Gore and Associates, Inc., Elkton Md., and under the tradename Tetratex® from Tetratec, Feasterville Pa. Impregnation of ePTFE with perfluorinated sulfonic acid polymer is disclosed in U.S. Pat. Nos. 5,547,551 and 6,110,333.

While the process of the invention can be performed to make discrete lengths of catalyst coated membrane with a limited number of electrodes on each side of the membrane, the invention is advantageously carried out by performing the raised relief printing in a continuous fashion using roll stock.

Figure 1:
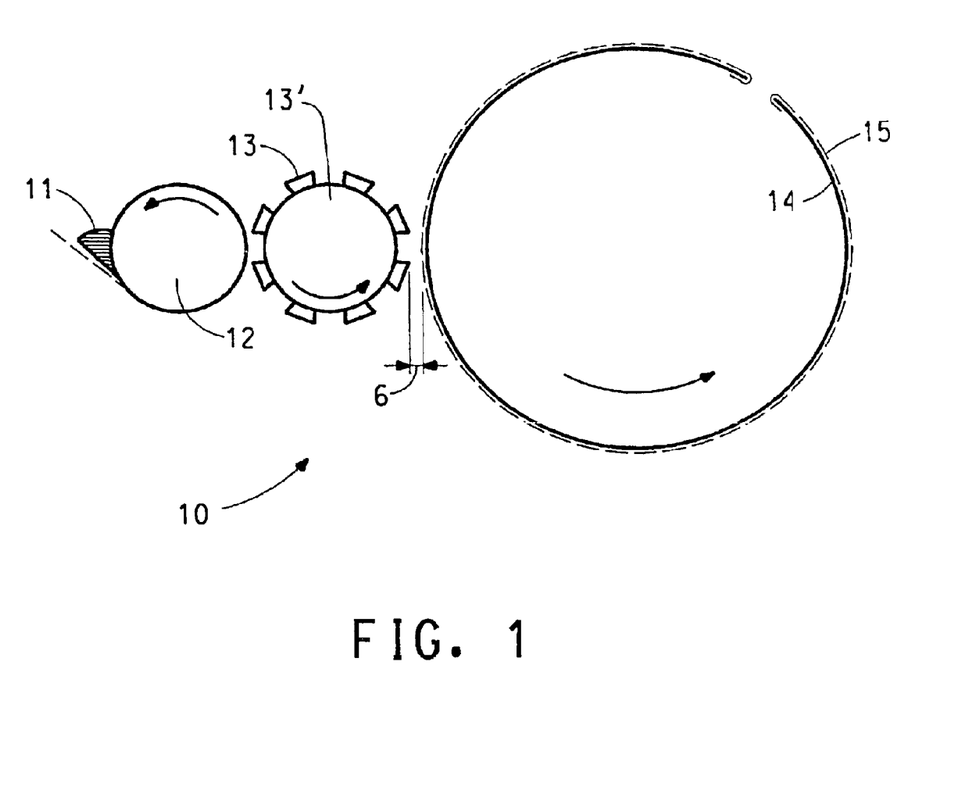
FIG. 1 is a schematic view showing the use of flexographic proof press equipment to form electrodes on one side of a discrete length of membrane in accordance with the present invention.

FIG. 1 shows the use of flexographic proof press equipment to form electrodes on one side of a discrete length of membrane in accordance with the present invention. As shown in FIG. 1, in coating station 10, the electrocatalyst coating composition 11 is picked up by the anilox roll 12. An anilox roll is a standardized tool of the printing industry consisting of a precision engraved cellular surfaced roll which draws out a uniform wet ink film from the ink reservoir. The wet ink thickness is controlled by the specific anilox cell geometry chosen. A portion of this ink film is transferred to a relief printing plate 13 having a plate impression 6, such as a Cyrel® flexographic printing plate, positioned on a drum 13'. A membrane 15, such as a perfluorinated sulfonic acid polymer membrane in acid form which is available under the trademark Nafion® from E.I. DuPont de Nemours and Company, positioned on a rotating drum 14 picks up the electrocatalyst coating composition 11 from the relief printing plate 13, to form a relief image on the membrane. The dried relief image serves as an electrode on the membrane. This can be repeated the desired number of passes to produce the desired thickness of the electrocatalyst coating composition 11. After drying, the membrane is then turned over for application to the opposite sides of a catalyst coating composition 11, which may be different from the first applied catalyst coating composition, to form an second electrode. For example, an anode may be formed on one side of the membrane and a cathode on the opposite side of the membrane.

Figure 2:
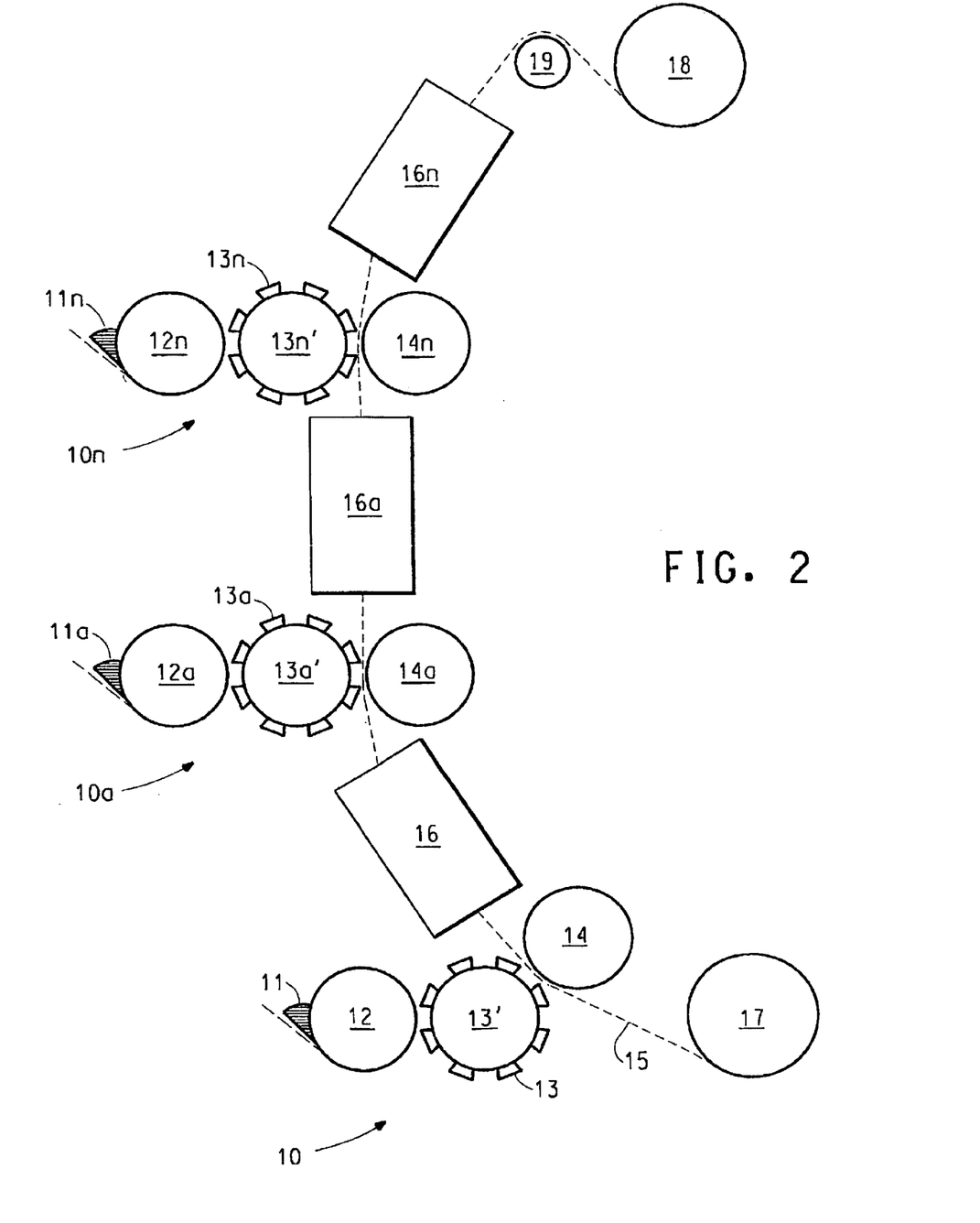
FIG. 2 is a schematic view showing a continuous process in accordance with the invention employing membrane roll stock utilizing three discrete printing stations to form multiple electrode layers in a continuous fashion.

FIG. 2 shows a continuous process employing rolls stock utilizing three discrete printing stations to form multiple electrode layers in a continuous fashion. As shown in FIG. 2, the membrane to be coated is unwound from roll 17, past the coating station 10 shown in FIG. 1 and a drying station 16. Additional coatings and drying can be accomplished as shown in coating stations 10a to 10n and drying stations 16a and 16b, on to the coated and dried membrane from coating station 10. Any number of coating stations may be present between 10a and 10n depending of the desired thickness of the electrode to be formed or different coating compositions may be applied at each coating station to form different electrodes on the surfaces of the membrane. In coating stations 10a and 10n respectively, electrocatalyst coating compositions 11a and 11n are picked up by the anilox rolls 12a and 12n and transferred to relief printing plates 13a and 13n, positioned on a drum 13a' and 13n'. The coated and dried membrane from coating station 10n is then wound onto roll 18 past idler roll 19 as shown. The membrane may then be turned over and run though the process again to produce electrodes on the opposite sides. The electrocatalyst coating compositions at the three stations may be the same or different. Additional stations can be employed on line to print on the opposite side of the membrane so that the catalyst coated membrane may be completed in one pass.

The direct product of the process is a length of membrane with multiple electrodes formed on it. Preferably, the product has the ion exchange polymer in the electrodes and in the membrane in acid form, which upon cutting, is suitable for end use without necessary processing steps. The product can be stored in roll form which facilitate handling and/or subsequent processing operation. For some applications, calendering can be employed to consolidate the electrode structure that is useful for improving performance and this can easily be preformed on the product stored in roll form. Other treatments to improve performance are easily performed on the product stored in rolls form and can include acid washing, e.g., nitric acid washing, heat treatments, etc.

For use in making membrane electrode structures, the direct CCM product of the process, after post treating if performed, is cut into the desire size pieces and laminated to appropriate gas diffusion media by known techniques. The cutting operation is preferably supplied with CCM in roll form that is fed to appropriate slitting and cutting equipment to achieve high volume manufacture.

EXAMPLES

Example 1

Preparation of Alcohol Dispersions of Ion Exchange Polymer (Perfluorinated Sulfonic Acid Polymer—Acid Form)

A 3 liter rotary evaporator flask is charged with 1000 g of a perfluorinated sulfonic acid polymer dispersion (Nafion®—obtained from DuPont), comprising 5 wt % 1100 EW perfluorinated sulfonic acid polymer (PDMOF), in 50% water–50% mixed alcohol (methanol, ethanol, 2-propanol media)). Rotary evaporation is commenced at 60 rpm, 15 mm Hg pressure, with the evaporation flask immersed in a 25° C. $H_2O$ bath. A dry ice/acetone bath (-80° C.) is used as the overheads condenser. After several hours of slow, steady operation, 520 gms of $H_2O$/mixed alcohols is removed. As the solids level increased to a nominal 10% level, a noticeable increase in viscosity. (3→20 cps) is observed. A slow approach to this point is necessary to avoid irreversible gelation.

After a 50 gm sample of the evaporation flask residue is removed, 450 g of n-butanol is added to the evaporation flask. The clear liquid turns an opaque, milky white. The roto-vap operation is continued under the same conditions for several more hours until a clear liquid product (436 gms) is obtained. The final measured solids content is 9.51%. The condensed solvent weighes 344 g, indicative of some vapor bypassing the dry ice condenser. A thin butanol layer is observed on the bulk $H_2O$ recovered indicating some butanol vaporization at the conditions chosen.

Repetitions of this basic procedure yield perfluorinated sulfonic acid polymer dispersions in n-butanol with solids contents of up to approximately 13.5% by weight without gelation. Viscosities of the dispersions obtained are typically in the range of 500 to 2000 cps. (Brookfield/20 to 24° C.). Karl Fisher determinations indicate total residual $H_2O$ content ranging up to 3% in the various dispersions.

In addition to the indicated perfluorinated sulfonic acid polymer dispersion (5% solids, 1100 EW), alternate starting perfluorinated ion exchange polymer suspensions can be utilized. For example, 990 EW perfluorinated sulfonic acid polymer (PDMOF) at 18% solids in 80% mixed alcohol–20% $H_2O$ media produces similar results. Similarily, 1100 EW perfluorinated sulfonic acid polymer (PDMOF) at 50% solids in water and nominal 800 EW perfluorinated sulfonic acid polymer (POPF) at 5% solids in mixed water/alcohol make similar alcohol dispersions using the procedure described above.

In place of n-butanol, other alcohols that were used successfully in the above procedure are n- and iso-amyl alcohol (n- and iso-pentanol), cyclohexanol, n-hexanol, n-heptanol, n-octanol, glycol ethers and ethylene glycol.

Example 2
Preparation of Electrocatalyst Coatings Compostions

Using the above containing perfluorinated sulfonic acid polymer/alcohol dispersions as basic component, catalyst coatings suitable for flexographic printing of CCMs for use in fuel cells are prepared as follows:

A 13.2 wt % solids perfluorinated sulfonic acid polymer (1100 EW—PDMOF) in n-butanol dispersion, prepared as described above (28.94 g) is combined with 77.31 g n-butanol. The resulting mixture is then cooled down to ~10° C., well below the 35° C. n-butanol flash point, by the addition of dry ice. This serves to both lower the temperature and to displace the ambient $O_2$ with the generated $CO_2$ gas, thus providing an added margin of safety for the addition of the potentially pyrophoric catalyst powder (platinum supported on carbon). To the cooled mixture, 18.75 g of 60/40 C/Pt (E-Tek Corporation) is added slowly with vigorous stirring in order to wet out the powder instantly and to rapidly dissipate the heat of adsorption. (~5 minutes total). Component amounts are calculated to yield a final solids content of 18.07 wt %. The calculated catalyst content on a dry solids basis is calculated to be 83.07 wt %.

This mixture is then combined with 100 g of zirconia cylinders (0.25 inch×0.25 inch diameter) grinding media in a 250 $cm^3$ mill jar. The jar is sealed and placed on a roll mill table at ~200 rpm at room temperature for 3 to 5 days. After this dispersion method the coating composition is ready for testing and printing operations.

The final coating composition at nominal 18% solids has a stiff "cold cream"—like consistency that measures in the 5,000 to 20,000 cps viscosity range by simple Brookfield methods. Simple gravimetric solids check give results in the 17.8 to 18.3% range. Knife coatings on heavy gauge Mylar® polyester film are useful to further characterize the coating before printing press application. A 5 mil draw knife produces a glossy black wet coating which dries (1 hr/22° C.) to a flat black, fine velvet texture, free from large particles, cracks, craters, repellencies and streaks.

Example 3
Preparation of CCM's Utilizing Above Electocatalyst Coating Compositions Cyrel® flexographic printing technology (DuPont Company) is used with the above electrocatalyst coating composition to print directly on a variety of perfluorinated sulfonic acid polymer (acid form) film substrates. The press used is a GMS Print Proof system as made by GMS Co. (Manchester, England).

The as received Cyrel® flexographic plate stock is photo-imaged via strong UV exposure to a precision pattern by a photographic contact negative "tool". Exposed areas of thick photopolymer mixed film are UV crosslinked. The unexposed areas are next washed away by the appropriate Cyrel® developer solution. Left behind is the cross-linked, rubbery plate surface in sharp relief areas that act to transfer coating compositions in precise patterns and thicknesses to a moving film substrate. The flexographic plate is mounted on a roll which in rotary motion prints the composition on the moving substrate. After printing the moving plate is re-coated by contacting a precision cellular applicator roll. The cellular applicator in turn receives a fresh, metered coating composition supply from a stationary reservoir or "fountain".

To utilize this GMS printing device, a cast perfluorinated sulfonic acid polymer membrane (990 EW PDMOF), 1.5 mils thick, approximately 3" wide and 10' long is mounted on the print drum. The Cyrel® flexographic plate formulation PLS was imaged to produce three 50 $cm^2$ (7×7 cm) squares aligned vertically, with each square separated by 4 cm of non-image area. The plate and print drum geometry is such that 5 separate plate impressions can be achieved per single rotation of the print drum holding the membrane. In a single print drum rotation 15 single impressions are made. The relative speed difference between plate and print drum is zero over the cycle eliminating scuffing, scratches etc. The plate/film gap is adjusted to achieve plate/film contact with an additional 2 mils of plate/film compression during the initial press setup. This is provided by adjusting the GMS anilox roll to mounted substrate gaps and alignment.

The anilox cell count selected was 300 lines/inch which in printers terminology gives ~5 billion cubic microns per sq inch. This in turn translates to a nominal 8 to 9$\mu$ wet thickness on the anilox roll. This wet film layer in part transfers to the plate. The plate in turn transfers part of this wet film layer thickness from the plate to the membrane substrate.

After printing, the plate surface is immediately re-coated by immediate rotational contact with the anilox roll specifically chosen for exact coating metering to Cyrel® flexographic plate surfaces. The typical deposition thickness of dried coating composition to the membrane substrate is about 0.7 to 0.9 microns with the 18% solids formulation coating described above. To build increased catalyst layer thickness, with typically 0.7 to 0.9 micron dried increments, with fixed coating/plate conditions, printing is repeated one or more times with approximately +/−0.2 mm registration on the first dried layer to yield additional layer(s). Additional layers can be added in successive print/dry applications to balance potential performance versus incremental catalyst cost. Multiple prints also tend to smooth out any deposition non-uniformity associated with the printing process. After the perfluorinated sulfonic acid polymer film is printed with one or more layers to the desired thickness/density, it may be turned over, remounted on the drum in very precise registration with the first side printing, and the print process repeated to form the second side of the CCM. The misregistration observed for as many as 12 prints/side (or 24 on both sides combined) is on the order of 0.2 mm.

In this way catalyst coated membranes (CCM) have been reproducibly machine manufactured at high speed with little or no waste. All perfluorinated sulfonic acid polymer components were used in the acid form so that there is no need for subsequent hydrolysis steps.

In addition to using cast perfluorinated sulfonic acid polymer membrane, the same catalyst printing technique can be performed on 1 and 2 mil melt extruded membrane in the acid form and on 1 and 2 mil polytetrafluorethylene (PTFE)/Nafion® composite film substrates.

Example 4
Preparation of n-hexanol Based Ion Exchange Polymer Dispersion Electrocatalyst Coating Composition and CCMs Modifications of the procedures as described in Examples 1 and 2 are used to prepare an 18% solids electrocatalyst coating composition. The modifications consist of replacing n-butanol with n-hexanol and replacing the 1100 equivalent weight perfluorinated sulfonic acid polymer starting solution with 990 equivalent weight perfluorinated sulfonic acid polymer solution.

The resulting electrocatalyst compositions are printed on a 3 inch by 10 foot strip of 2 mil thick a cast perfluorinated sulfonic acid polymer membrane (1100 EW PDMOF) (acid form) by the method described in Example 3 except that 5 cm by 5 cm electrocatalyst impressions are made. The flexographic plate contains 6 of the 5×5 cm squares; 5 contacts of the plate to the above membrane film gives 30 squares. To build catalyst thickness, printing is done 4 times in precise register per film side in a print/dry, print/dry series of steps. The amount of distortion caused by alcohol swelling of the film is negligible. The thickness of the final product was measured around the outer border of the electrocatalyst composition squares and also at the center of the squares (Ono-Soki Gauging system EG 225 with 1.0 micrometer accuracy/resolution). The average substrate thickness measures 49.3 micrometers. The average "substrate plus two-sided catalyst" thickness measures 56.7 micrometer. By difference, the total catalyst thickness is 7.4 micrometer, which is 3.7 micrometer per side. By calculation, the dried catalyst thickness per print impression is 0.93 micrometer.

Example 5
Fuel Cell Testing of CCM's

A 5×5 cm CCM prepared as in Example 4 is tested in a single cell hydrogen-air fuel cell using carbon cloth gas diffusion media sold under the trademark ELAT® by E-Tek Corporation under the following conditions.
Experimental Conditions
Fuel Cell Clamping Force=4.0 ft-lb
Fuel Cell Temperature=80° C.
Anode Gas=Hydrogen
Anode Gas Stoichiometry=1.5 at 2 A/cm$^2$
Anode Pressure=15 PSI
Cathode Gas=Air
Cathode Stoichiometry=2.0 at 2 A/cm$^2$
Cathode Pressure=15 PSI
Anode and cathode gases were humidified.

Fuel Cell Performance Data

| Cell Voltage (volts) | Current (amps) | Current Density amps/cm$^2$ | Power Density watts/cm$^2$ |
|---|---|---|---|
| 0.306 | 40.380 | 1.615 | 0.494 |
| 0.402 | 38.330 | 1.533 | 0.616 |
| 0.499 | 34.580 | 1.383 | 0.690 |
| 0.595 | 28.380 | 1.135 | 0.675 |
| 0.708 | 15.280 | 0.611 | 0.433 |
| 0.805 | 3.640 | 0.146 | 0.117 |
| 0.896 | 00.000 | 0.000 | 0.000 |

Example 6

The procedures described in Examples 1, 2 and 4 were used to prepare an 18% solids electrocatalyst coating composition based on n-hexanol and 990 equivalent weight perfluorinated sulfonic acid polymer solution with the catalyst being 60 wt % Pt on carbon as supplied by Johnson Mathey under the designation FC-60. The dry catalyst to polymer weight ratio was held at 5:1. This was printed on the same film substrate as in Example 4 with the same flexographic plate on the same equipment with the following exception: a anilox cell count used was 140 lines/inch with nominal 10.5 billion cubic microns/square inch instead of a 300 lines/inch. This provides an approximate 17 $\mu$m ink wet thickness on the anilox surface.

Film samples were taken from this process after 2, 4, 6, 8 print impressions. The dried printed catalyst areas were analyzed under Inductively Coupled Plasma (ICP) to determine platinum content/area as a function of the number of print impressions. The results were:

| Print Impressions | Pt Loading (mg/cm2) |
|---|---|
| 2 | 0.09 |
| 4 | 0.16 |
| 6 | 0.29 |
| 8 | 0.41 |

This set of data allows the following linear relationship (Y=mX+b) to be formed for this particular ink/anilox combination with 98.56% R$^2$ Correlation:

Pt Loading (mg/cm2)=0.0545×(#Print Impressions)−0.035 wherein Y=Pt Loading (mg/cm2); X=#Print Impressions m (slope)=0.0545; and b (intercept)=−0.035

In this fashion, by adjusting the number of impressions, using different anilox roll sizes, altering the platinum content of the catalyst particles, the catalyst/polymer ratio, the % solids of the composition etc. the catalyst loading can be adjusted and controlled in a number of different ways. The catalyst can be chosen to provide the required quality, uniformity & productivity at the lowest overall cost.

What is claimed is:

1. A process for manufacturing a catalyst coated membrane comprising:

preparing an electrocatalyst coating composition comprising an electrocatalyst and an ion exchange polymer in a liquid medium; and raised relief printing said electrocatalyst coating composition onto a first surface of an ion exchange membrane, said relief printing forming at least one electrode layer covering at least a part of said surface of said membrane.

2. The process of claim 1 wherein said raised relief printing is flexographic printing.

3. The process of claim 1 wherein said raised relief printing is repeated to form multiple electrode layers covering the same part of the surface of said membrane.

4. The process of claim 3 wherein said raised relief printing provides multiple electrode layers which vary in composition among said multiple layers.

5. The process of claim 1 wherein said raised relief printing provides an electrode layer with a predetermined nonuniform distribution of electrocatalyst across the electrode layer.

6. The process of claim 1 further comprising raised relief printing at least one nonelectrocatalytic coating composition to form a nonelectrocatalytic layer over at least part of the same area of the membrane which is covered by an electrode layer.

7. The process of claim 6 wherein said nonelectrocatalytic layer is a protective coating covering said electrode layer.

8. The process of claim 1 further comprising raised relief printing said catalyst coating composition onto the surface opposing said first surface of an ion exchange membrane, said relief printing forming at least one electrode layer covering at least a part of said surface opposing said first surface of said membrane in registration with the electrode layer on said first surface.

9. The process of claim 1 wherein said ion exchange polymer in said electrocatalyst coating composition and in said membrane comprise highly fluorinated ion exchange polymer.

10. The process of claim 1 wherein said ion exchange polymer in said electrocatalyst coating composition and in said membrane comprise perfluorinated ion exchange polymer.

* * * * *